(12) United States Patent
Kato et al.

(10) Patent No.: US 10,889,211 B2
(45) Date of Patent: Jan. 12, 2021

(54) VEHICLE BODY STRUCTURE

(71) Applicant: HONDA MOTOR CO., LTD., Tokyo (JP)

(72) Inventors: Masahiro Kato, Wako (JP); Asato Ikezumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/353,588

(22) Filed: Mar. 14, 2019

(65) Prior Publication Data
US 2019/0283806 A1 Sep. 19, 2019

(30) Foreign Application Priority Data
Mar. 19, 2018 (JP) .................... 2018-050329

(51) Int. Cl.
*B60N 2/30* (2006.01)
*B60J 5/04* (2006.01)
(Continued)

(52) U.S. Cl.
CPC ........... *B60N 2/3011* (2013.01); *B60J 5/0451* (2013.01); *B62D 21/157* (2013.01);
(Continued)

(58) Field of Classification Search
CPC ... B60J 5/04; B60J 5/042; B60J 5/0423; B60J 5/0443; B60J 5/0451; B60N 2/12; B60N 2/30; B60N 2/3011; B60N 2/3013; B60N 2/3065; B60N 2/3072; B60N 2/4235; B60N 2/427; B60N 2/42709; B62D 21/157
(Continued)

(56) References Cited

U.S. PATENT DOCUMENTS 4,272,103 A * 6/1981 Schmid .................. B60R 19/42
280/751
6,299,238 B1 * 10/2001 Takagi ................. B60N 2/4235
296/187.12
(Continued)

FOREIGN PATENT DOCUMENTS

JP S48-83519 U 10/1973
JP 11222088 A * 8/1999 ........... B60N 2/4235
(Continued)

OTHER PUBLICATIONS

English translation of JP 11-222088; retrieved Apr. 28, 2020 via J Plat Pat located at https://www.j-platpat.inpit.go.jp/. (Year: 2020).*
(Continued)

*Primary Examiner* — Jason S Daniels
(74) *Attorney, Agent, or Firm* — Rankin, Hill & Clark LLP

(57) ABSTRACT

There is provided a vehicle body structure including: a seat member storable in a floor of a vehicle body; a front door disposed on a vehicle-width directional outer side relative to the seat member; a first load transmission member and a second load transmission member disposed in the front door and configured to transmit a side collision load to the seat member at a side collision. The first load transmission member and the second load transmission member are arranged higher than an upper surface of the seat member being in a dive-down stored condition.

10 Claims, 9 Drawing Sheets

(51) Int. Cl.
  *B62D 21/15* (2006.01)
  *B62D 25/02* (2006.01)
  *B60N 2/12* (2006.01)
  *B60N 2/427* (2006.01)
  *B60N 2/42* (2006.01)
(52) U.S. Cl.
  CPC .............. *B62D 25/025* (2013.01); *B60N 2/12* (2013.01); *B60N 2/3013* (2013.01); *B60N 2/3047* (2013.01); *B60N 2/3065* (2013.01); *B60N 2/4235* (2013.01); *B60N 2/42709* (2013.01)
(58) Field of Classification Search
  USPC ............................ 296/146.6, 187.05, 187.12
  See application file for complete search history.

(56) References Cited

U.S. PATENT DOCUMENTS

| | | | | |
|---|---|---|---|---|
| 6,299,239 | B1 | 10/2001 | Sagawa et al. | |
| 6,364,398 | B1* | 4/2002 | Kim | B60J 5/0443 |
| | | | | 296/146.6 |
| 7,121,611 | B2* | 10/2006 | Hirotani | B60J 5/0451 |
| | | | | 296/146.7 |
| 8,651,550 | B2* | 2/2014 | Mather | B60N 2/3065 |
| | | | | 296/65.09 |
| 9,789,789 | B2 | 10/2017 | Akutsu | |
| 2006/0038428 | A1* | 2/2006 | Song | B60N 2/427 |
| | | | | 296/187.12 |
| 2006/0202513 | A1* | 9/2006 | Matsuda | B60N 2/42736 |
| | | | | 296/187.12 |
| 2009/0224571 | A1* | 9/2009 | Huttsell | B60J 5/0425 |
| | | | | 296/187.05 |
| 2012/0038182 | A1* | 2/2012 | Onda | B60J 5/0458 |
| | | | | 296/146.6 |

FOREIGN PATENT DOCUMENTS

| | | |
|---|---|---|
| JP | 2001-191880 A | 7/2001 |
| JP | 2003-220913 A | 8/2003 |
| JP | 2004-284436 A | 10/2004 |
| JP | 3852252 B2 | 11/2006 |
| JP | 2007-022353 A | 2/2007 |
| JP | 2007-161199 A | 6/2007 |
| JP | 2012-025255 A | 2/2012 |
| JP | 2013-119278 A | 6/2013 |
| JP | 2013-226868 A | 11/2013 |
| JP | 6161956 B2 | 7/2017 |

OTHER PUBLICATIONS

Japanese Office Action (English translation is not available) dated Sep. 10, 2019, (4 pages).

* cited by examiner

VEHICLE BODY STRUCTURE

CROSS-REFERENCE TO RELATED APPLICATIONS

This application is based upon and claims the benefit of priority from Japanese Patent Application No. 2018-050329 filed on Mar. 19, 2018; the entire contents of which are incorporated herein by reference.

BACKGROUND OF THE INVENTION

The invention relates to a vehicle body structure provided with a load transmission member which is capable of transmitting a side collision load to a seat member at a side collision.

For example, Patent Document 1 (Japanese Patent No. 6161956) discloses a seat structure which can store a seat of a seat back and a seat cushion in a storing floor that is lower in position than a vehicle floor.

Patent Document 2 (Japanese Patent No. 3852252) discloses a structure which transmits a side collision load at a side collision to a seat using a reinforcement member disposed in a center pillar.

Meanwhile, the seat structure disclosed in Patent Document 1 has a seat stored condition where a seat body inclines forward to be folded and stored in the storing floor. In this condition, for example, a baggage or the like is usually placed on the seat. Patent Document 2 discloses that the side collision load is made to transmit to the seat.

If, for example, the seat (in which an occupant is not seated) is in a stored condition where the baggage is placed on the seat, a side collision load may be transmitted to the seat.

SUMMARY OF THE INVENTION

The invention is directed to a vehicle body structure which prevents a side collision load from transmitting to a seat member when the side collision load does not need to transmit to the seat member.

An aspect of the invention provides a vehicle body structure including: a seat member including a seatback, a seat cushion, and a seat frame supporting the seat cushion and being storable in a floor of a vehicle body; and a door member disposed on a vehicle-width directional outer side relative to the seat member; and a load transmission member disposed in the door member and configured to transmit a side collision load to the seat member being in a non-stored condition at a side collision. The load transmission member is disposed higher than an upper surface of the seat member being in a stored condition.

According to the aspect, the vehicle body structure is achieved, which prevents a side collision lord from transmitting to the seat member when the side collision load does not need to transmit to the seat member.

BRIEF DESCRIPTION OF THE ACCOMPANYING DRAWINGS

DETAILED DESCRIPTION OF THE EMBODIMENTS

Figure 1:
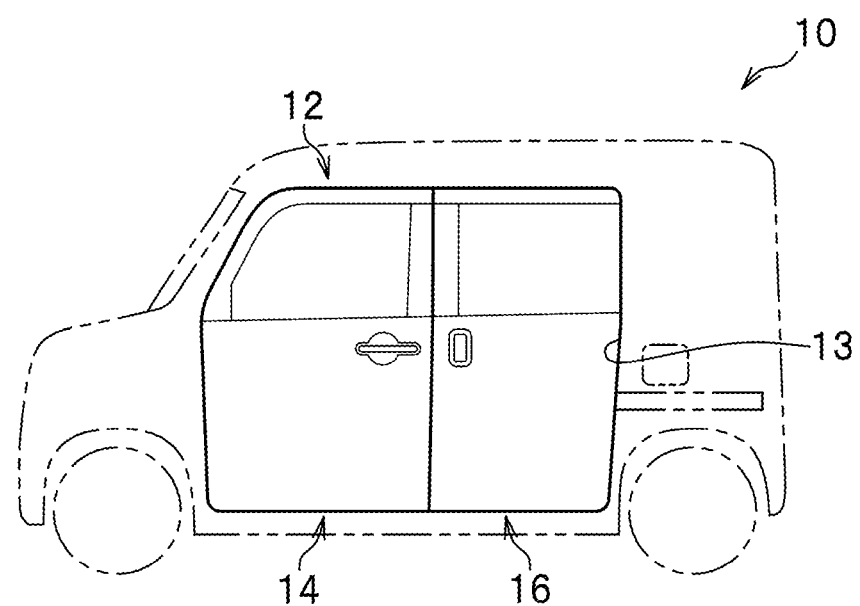
FIG. 1 is a partially imaginary left side view of a vehicle to which a vehicle body structure according to an embodiment of the invention is applied.
Figure 1:
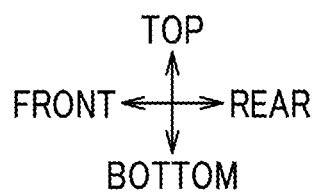

An embodiment of the present invention will be hereinafter described in detail with reference to the accompanying drawings depending on the necessity. In the drawings, "front-rear," "left-right" and "top-bottom" represent a vehicle front-rear direction, a vehicle left-right direction (vehicle-width direction) and a vehicle vertical direction (vehicle up-down direction), respectively.

As illustrated in FIG. 1, a vehicle 10 to which a vehicle body structure according to an embodiment of the present invention is applied is a vehicle with no center pillar on one side. The vehicle 10 includes: a vehicle body left part 12 having no center pillar; and a vehicle body right portion (not illustrated) disposed in a vehicle-width direction on the opposite side of the vehicle body from the vehicle body left part 12, and having a center pillar (not illustrated).

The embodiment shows the vehicle body structure applied to the vehicle with no center pillar on one side, but is not limited to this type of vehicle.

The vehicle body left part 12 includes: a first outer side panel provided on the outer side of the vehicle body left part 12; and a first inner side panel provided on the inner side of the vehicle body left part 12. The vehicle body right part includes: a second outer side panel provided on the outer side of the vehicle body right part; and a second inner side panel provided on the inner side of the vehicle body right part.

The first outer side panel includes a single door opening part 13 which is formed in a substantially rectangular shape in its side view. The door opening part 13 is made of an inner space surrounded by an outer side sill, an outer front pillar, an outer rear pillar, and an outer roof-side rail. An openable/closable front door (door member) 14 and a rear slide door 16 slidable in the vehicle front-rear direction are arranged in the door opening part 13. The front door 14 opens and closes the door opening part 13 by, on the vehicle rear side, turning around a hinge mechanism (not illustrated) serving as a turn shaft, and the hinge mechanism is arranged along an opening end edge on the vehicle front side.

Two door opening parts (not illustrated) are formed in the second outer side panel in the vehicle front-rear direction. The two door opening parts include: a front door opening part located in front of the center pillar; and a rear door opening part located in the rear of the center pillar.

Descriptions will be hereinbelow provided for the front door 14 with no center pillar on its side (on the left side).

Figure 3:
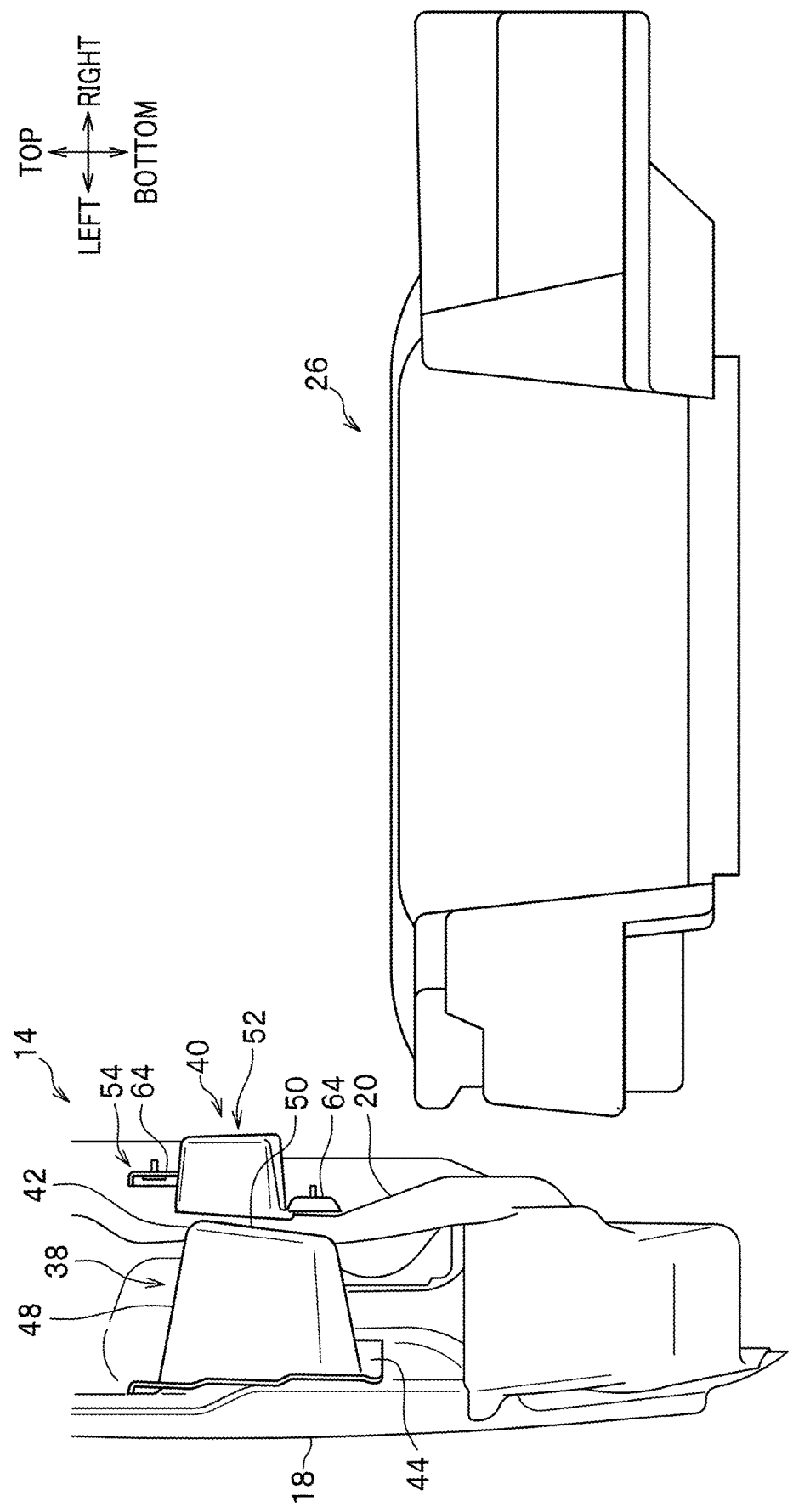
FIG. 3 is a schematic view of a front door and a seat member in a dive-down stored condition as viewed from the rear of the vehicle, in which an inner frame is omitted.
Figure 4:
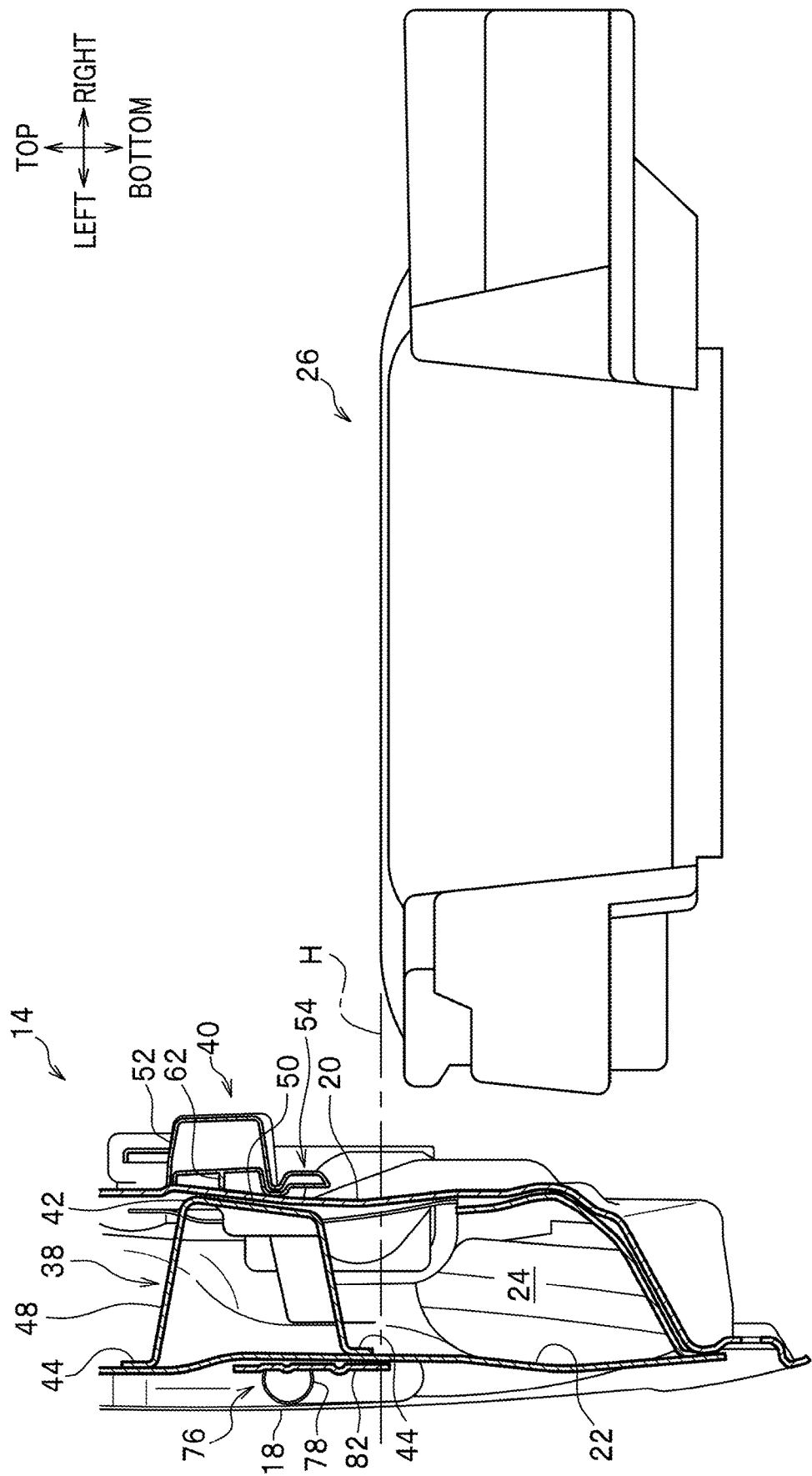
FIG. 4 is a back view of a front door and a seat member in a dive-down stored condition as viewed from the rear of the vehicle, in which a part of the front door is cut away.

As illustrated in FIGS. 4 and 3, the front door 14 includes: an outer frame 18 disposed on a vehicle-width directional outer side of the front door 14; an inner frame 20 disposed on a vehicle-width directional inner side of the front door 14; and a stiffener 22 installed between the outer frame 18 and the inner frame 20. The stiffener 22 is disposed on the outer side relative to the inner frame 20 in the vehicle-width direction. The inner frame 20 and the stiffener 22 of the front door 14 form a closed cross section 24 (see FIG. 4), although discussed later.

A dive-down storable seat member (front seat) 26 is disposed on the inner side relative to the front door 14 in the vehicle-width direction. In other words, the front door 14 is disposed on the outer side relative to the seat member 26 in the vehicle-width direction. The seat member 26 is provided slidable in the vehicle front-rear direction with the assistance of a slide mechanism (not illustrated), and dive-down storable in the floor of the vehicle body. The dive-down storage means, for example, that while the front seat is not used by being seated, the front seat is folded and stored in a foot space on a front portion of the floor of the vehicle body for the purpose of doing things such as increasing a cargo room space (see FIG. 5C, although discussed later).

Figures 5A, 5B, 5C, 5D, 5E:
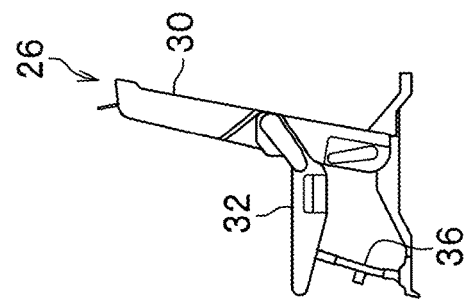
FIGS. 5A to 5E are schematic views each illustrating how the seat member is arranged.

As illustrated in FIG. 5A, the seat member 26 includes a seat back 30, a seat cushion 32, and a seat frame 34 for supporting the seat cushion 32. The seat member 26 is disposed in a way that makes the seat member 26 storable in the floor of the vehicle body. The seat back 30 supports the back of an occupant who is seated in the seat (seat member 26). The seat back 30 is provided capable of inclining forward over the seat cushion 32 by turning around a rear turn shaft (not illustrated). The seat cushion 32 supports the buttocks of the occupant. The seat cushion 32 is connected to a link arm 36 in a way that makes the seat cushion 32 capable of turning around a front turn shaft (not illustrated).

Figure 2:
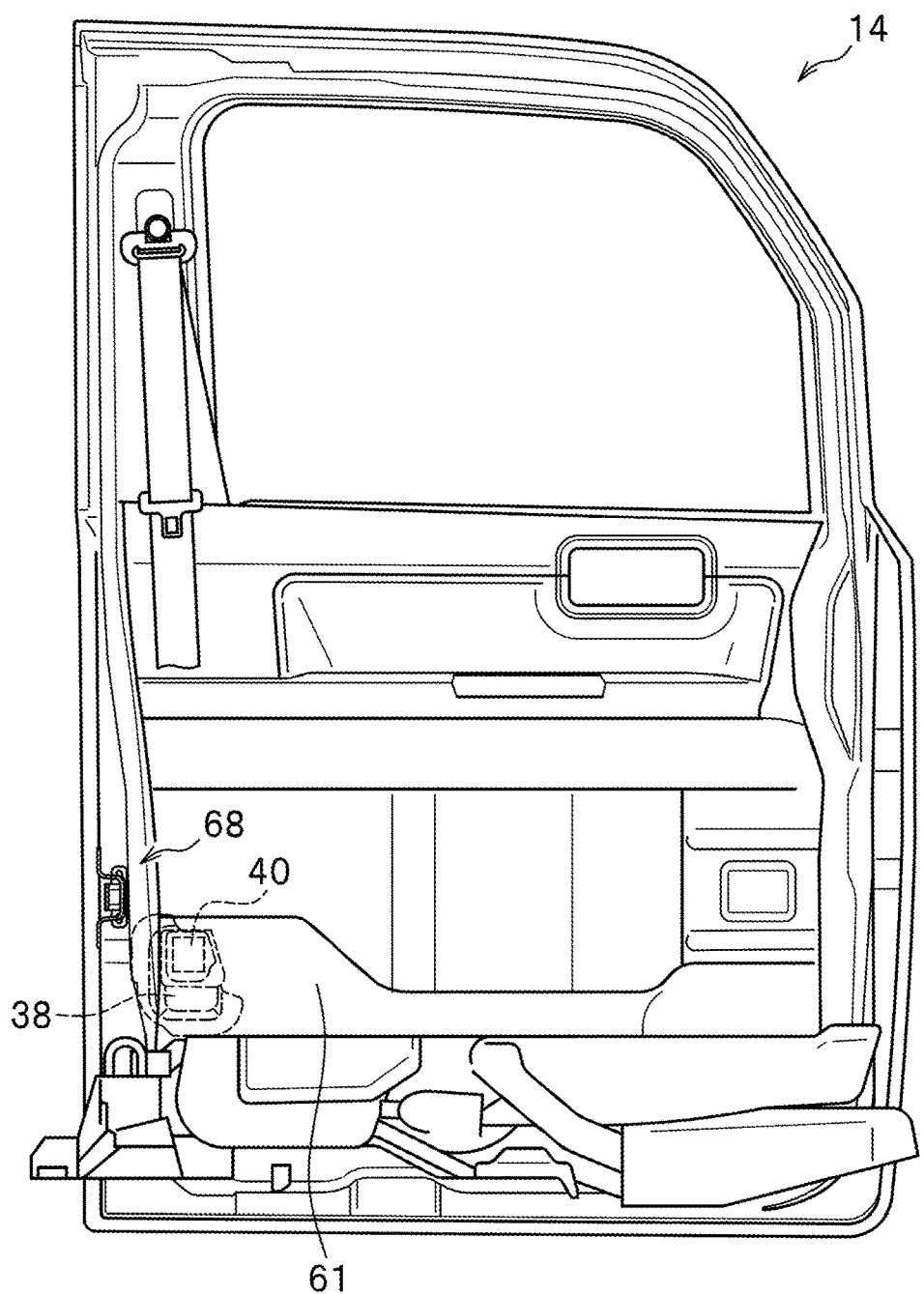
FIG. 2 is a partially imaginary front view of a left front door as viewed from the inside of a vehicle compartment.
Figure 2:
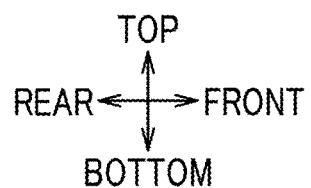

A pair of load transmission members are arranged inside the front door 14 (see FIG. 2). In the event of a side collision, the pair of load transmission members are capable of transmitting a side collision load to the seat member 26 as not being in the stored condition (the seat member 26 as not being dive-down stored). The pair of load transmission members include a first load transmission member 38, and a second load transmission member 40 having a smaller shape than the first load transmission member 38. Incidentally, in the embodiment, the first load transmission member 38 is made of a metal material (a steel plate or the like) while the second load transmission member 40 is made of a resin material. The materials of the first and second load transmission members 38, 40 are not limited to them.

The first load transmission member 38 and the second load transmission member 40 are arranged in their respective places which substantially coincide with each other in the vehicle front-rear direction (see FIG. 2). Furthermore, the first load transmission member 38 and the second load transmission member 40 are arranged in their respective places which substantially coincide with each other in the vehicle up-down direction (see FIGS. 3 and 4). In the embodiment, both the first load transmission member 38 and the second load transmission member 40 constitute a "load transmission member" in claims.

Although formed individually and separately from each other in the embodiment, the first load transmission member 38 and the second load transmission member 40 may be formed into an integrated unit.

Figure 6:
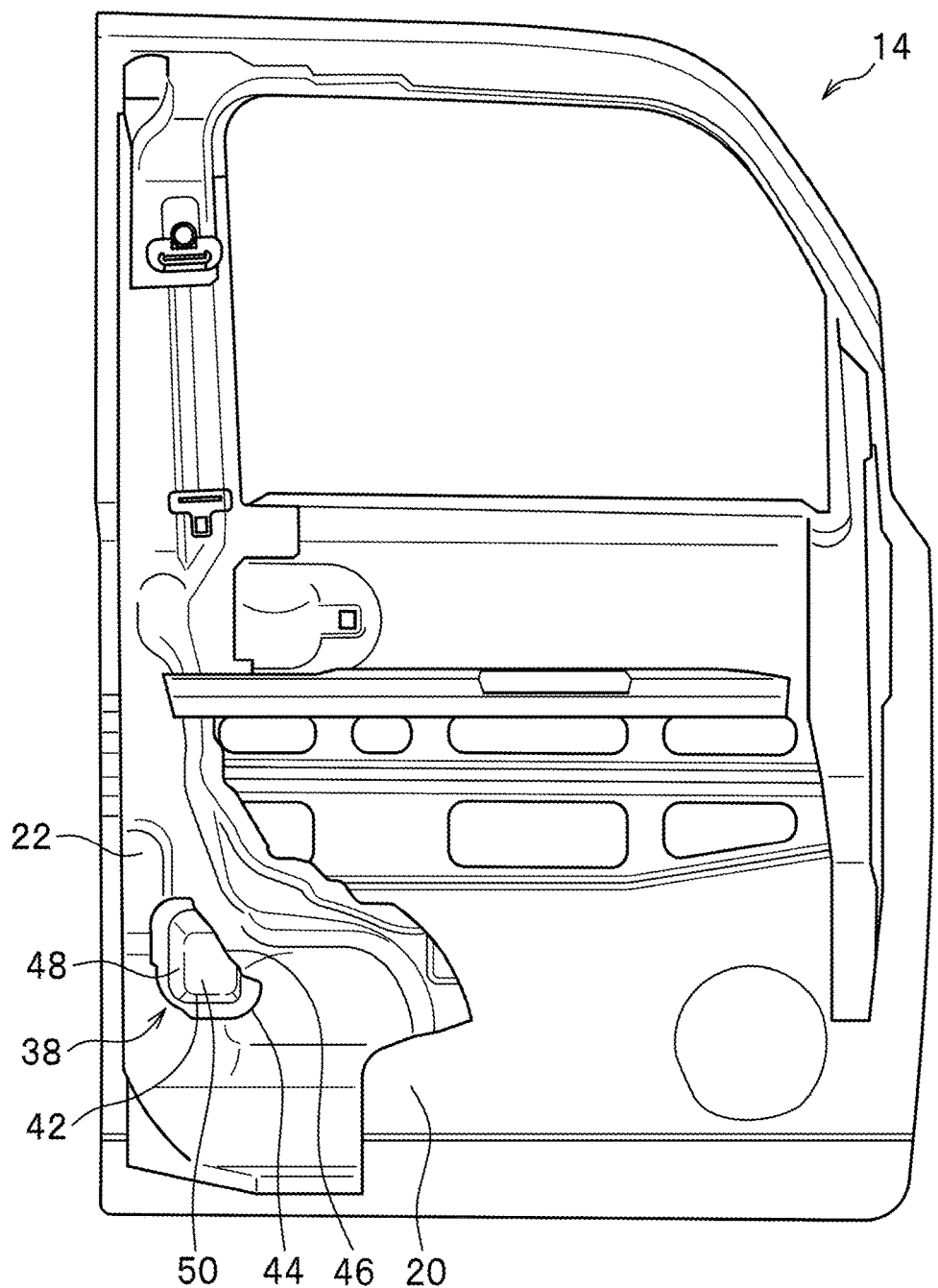
FIG. 6 is a partially-cutaway front view illustrating an inner frame, a part of which is cut away from the structure of FIG. 2.
Figure 6:
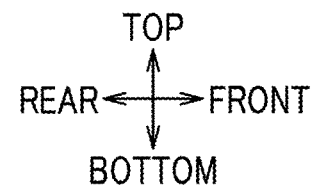
Figure 7:
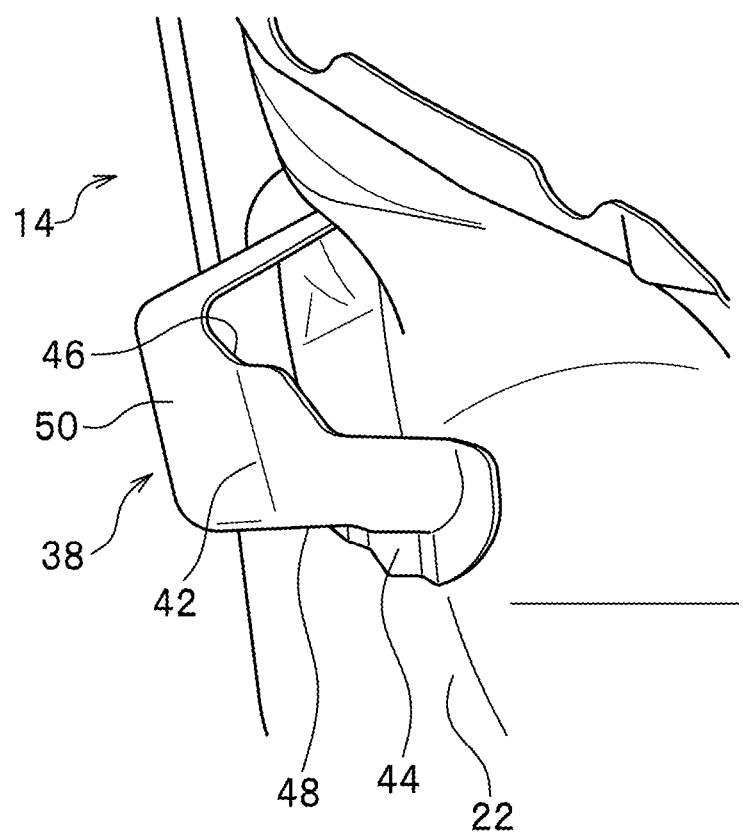
FIG. 7 is an enlarged perspective view of a first load transmission member.

As illustrated in FIGS. 6, 7 and 4, the first load transmission member 38 includes a bulge part 42, a flange part 44 and a cutaway part 46. The bulge part 42 includes: a side wall 48 jutting out in the vehicle-width direction toward the inside of the front door 14; and a substantially rectangular flat surface 50 which is a top portion of the first load transmission member 38, and which is continuous from the side wall 48. The flange part 44 is formed of a flat strip-shaped edge portion of the first load transmission member 38 along the foot of the bulge part 42. The cutaway part 46 is formed of an opening obtained by partially cutting away the bulge part 42 and the flange part 44 slantingly from the upper front portion to the lower rear portion of the first load transmission member 38 (see FIG. 6). The first load transmission member 38 is joined to the stiffener 22 of the front door 14 with the assistance of the flange part 44 (see FIG. 4).

As illustrated in FIG. 4, the second load transmission member 40 includes a box-shaped bulge part 52, and an attachment part 54. The box-shaped bulge part 52 includes a pair of left and right side walls facing each other, a pair of upper and lower side walls facing each other, and a top portion continuous from the left, right, upper and lower side walls. Incidentally, a rib 62 extending out toward the inner frame 20 is provided inside a space portion closed by the left and right walls, the upper and lower walls, and the top portion (see FIG. 4). In addition, the second load transmission member 40 is covered with a door lining (door trim) 61 which is provided on the inner side relative to the second load transmission member 40 in the vehicle-width direction (see FIG. 2).

The attachment part 54 includes: a pair of fastening pieces 64, 64 extending out upward and downward from the upper and lower side walls of the attachment part 54, respectively; and a fastening piece (not illustrated) extending out from the right side wall of the attachment part 54 toward the vehicle front. The second load transmission member 40 is fastened and fixed to the inner frame 20 of the front door 14 using bolts (not illustrated) which are inserted through the three fastening pieces 64, 64 (one of which is not illustrated).

FIGS. 5A to 5E are each a schematic view illustrating how the seat member is arranged.

The seat member 26 is provided in a way that enables the seat member 26 to be switched between a seated condition in which the occupant can be seated in the seat member 26 and a stored condition (a dive-down stored condition) in which the seat member 26 can be dive-down stored.

FIG. 5A illustrates the seated condition in which the occupant can be seated in the seat. FIG. 5B illustrates a condition in which the seat back 30 is inclined forward over the seat cushion 32 by being turned around the rear turn shaft (not illustrated) from the seated condition illustrated in FIG. 5A. FIG. 5C illustrates the dive-down stored condition in which the seat cushion 32 and the seat back 30 are arranged in a stack by turning the link arm 36 toward the vehicle rear and inclining the seat cushion 32 and the seat back 30 toward the vehicle front, from the seat condition illustrated in FIG. 5B. FIG. 5D illustrates a condition in which the seat cushion 32 and the seat back 30 are returned to the seat condition illustrated in FIG. 5B by pulling up the seat cushion 32 and the seat back 30 from the dive-down stored condition illustrated in FIG. 5C. FIG. 5E illustrates the seated condition in which the occupant can be seated in the seat, which is obtained by pulling up the seat back 30 by turning the seat back 30 around the rear turn shaft (not illustrated) from the seat condition illustrated in FIG. 5D.

While the seat member 26 is in the dive-down stored condition, the first load transmission member 38 and the second load transmission member 40 are arranged higher than the upper surface of the seat member 26 (the seat back 30)(see FIG. 4). Incidentally, in FIG. 4, a chain line H represents an imaginary line extending along the upper surface of the seat member 26, and extending to the front door 24 in the horizontal direction. While the seat member 26 is in the dive-down stored condition, the first load transmission member 38 and the second load transmission member 40 are arranged higher than the chain line H in the up-down direction. In contrast to this, while the seat member 26 is in the seated condition, the first load transmission member 38 and the second load transmission member 40 are located at levels where the first load transmission member 38 and the second load transmission member 40 can come into contact with the seat frame 34.

As illustrated in FIG. 2, a door catcher mechanism 68 is disposed in the rear of the first load transmission member 38 and the second load transmission member 40. The first and second load transmission members 38, 40 and the door catcher mechanism 68 are arranged in their respective places which coincide with one another in the height or vertical direction. Incidentally, in FIGS. 8 and 9, the second load transmission member 40 is schematically illustrated in a rectangular shape with a thick dotted line.

Figure 8:
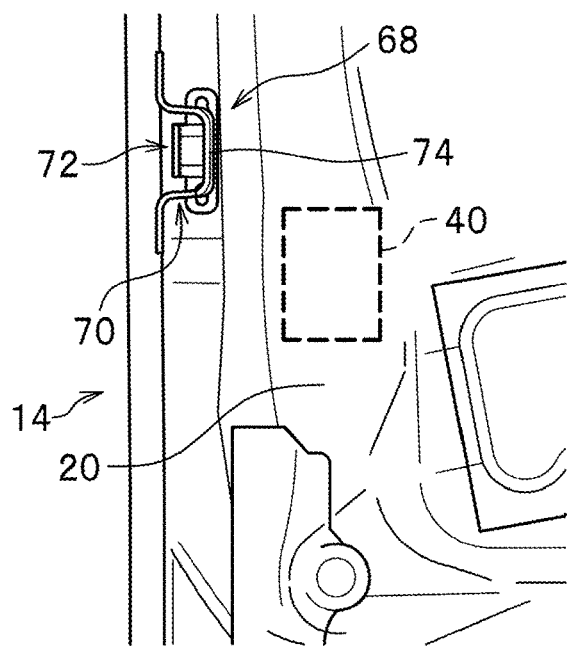
FIG. 8 is a front view illustrating a catcher mechanism.
Figure 9:
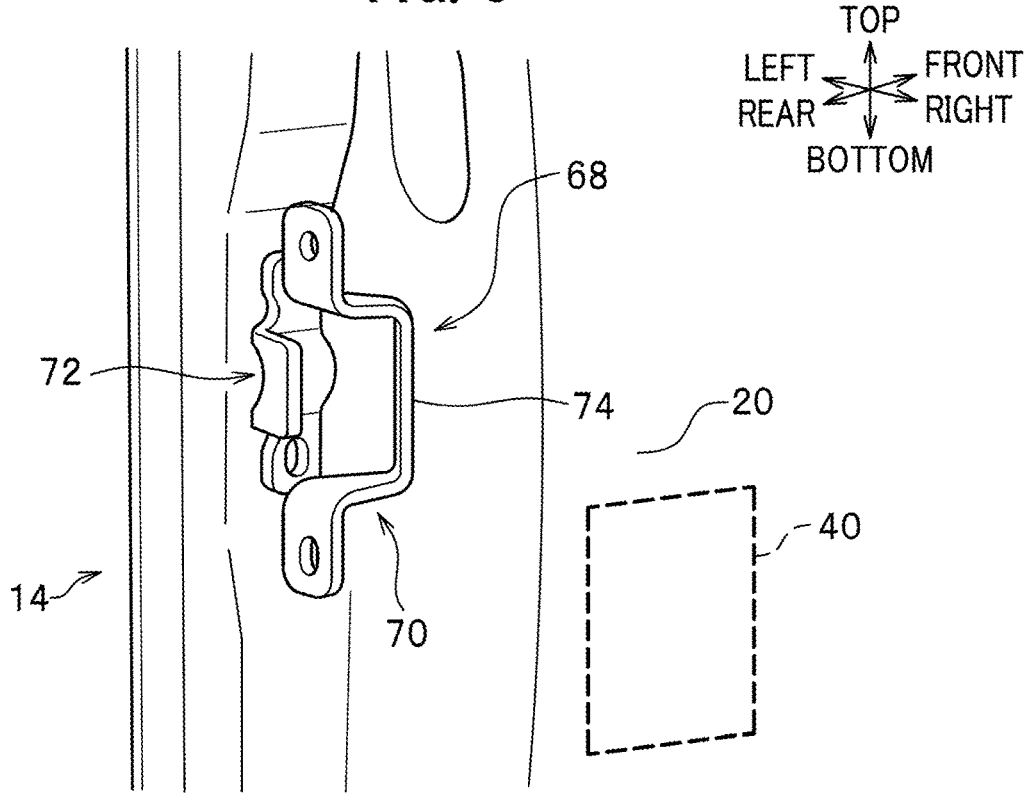
FIG. 9 is a perspective view illustrating a catcher mechanism.

As illustrated in FIGS. 8 and 9, the door catcher mechanism 68 includes: a catcher bracket 70 fastened and fixed to the vehicle body; and an engagement plate 72 fastened and fixed to the front door 14. Incidentally, since the vehicle to which the vehicle body structure according to the embodiment is applied is the vehicle with no center pillar on one side, the catcher bracket 70 is fixed to a vehicle front-side end surface of the rear slide door 16 located in the rear of the front door 14.

The engagement plate 72 is provided such that it is fixed to a vehicle rear-side end portion of the front door 14, and displaceable with the front door 14 integrally. The catcher bracket 70 includes an engagement part 74 which is bent in a substantial U-shape in its side view, and which extends out toward the vehicle front. The engagement plate 72 is provided such that the engagement plate 72 can come into engagement with the engagement part 74 when inserted into the engagement part 74 of the catcher bracket 70.

The engagement of the engagement plate 72 of the door catcher mechanism 68 with the engagement part 74 of the catcher bracket 70 prevent the front door 14 from being displaced inward in the vehicle-width direction in the event of a side collision. This prevents the deformation of the front door 14 even in a case where side collision load is inputted into the front door 14 from the outside.

The door catcher mechanism 68 includes an upper door catcher (not illustrated) and a lower door catcher (not illustrated) in addition to the door catcher disposed in the vehicle rear-side center portion of the front door 14. The upper door catcher (not illustrated) is disposed in a vehicle rear-side upper portion of the front door 14. The lower door catcher (not illustrated) is arranged in a vehicle rear-side lower portion of the front door 14.

Figure 10:
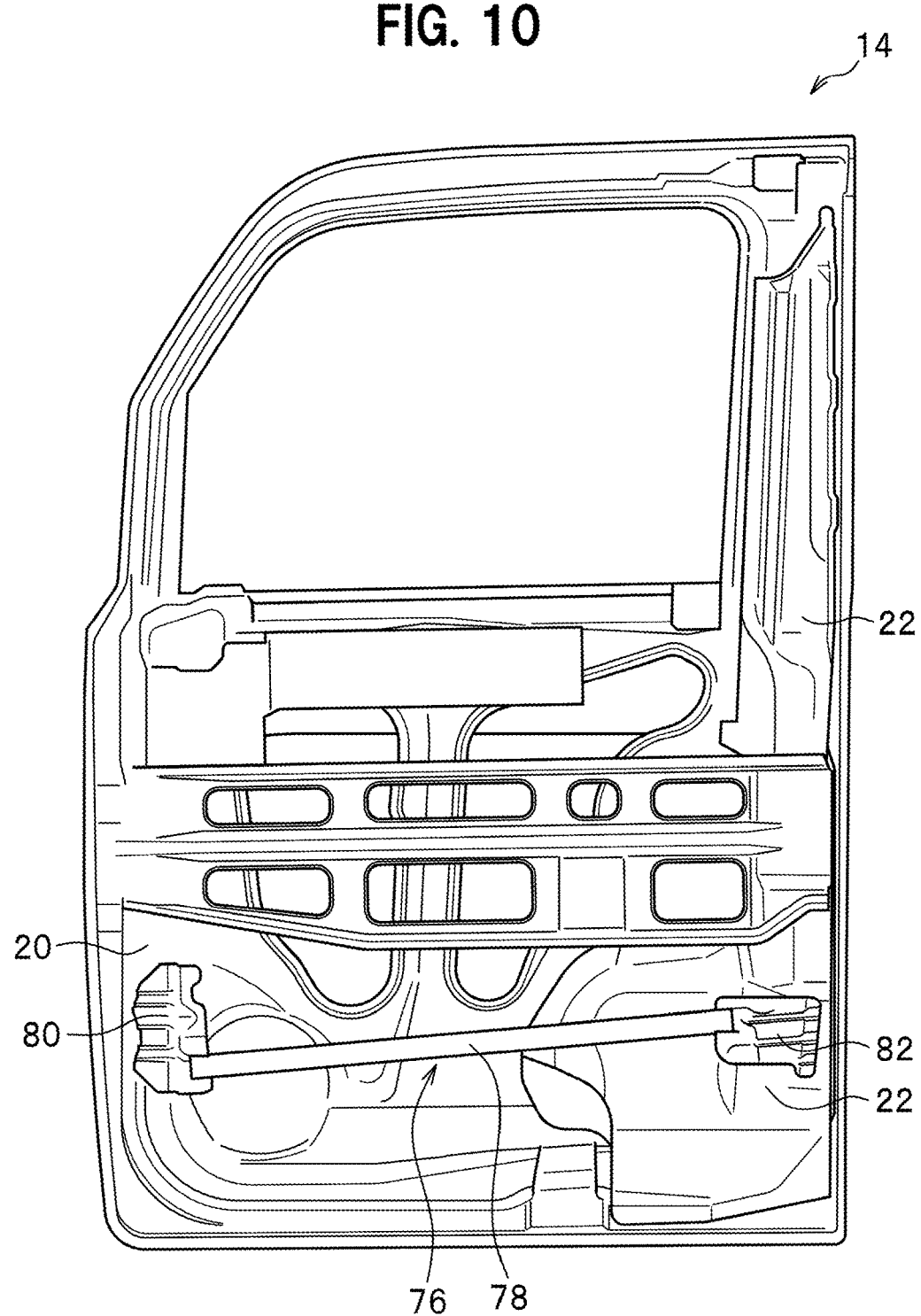
FIG. 10 is a front view illustrating a door beam member.

A door beam member 76 extending in the vehicle front-rear direction is disposed in the inside of the front door 14 which is located on the outer side relative to the second load transmission member 40 in the vehicle-width direction. As illustrated in FIG. 10, the door beam member 76 includes a door beam main body 78, a front connection plate 80 and a rear connection plate 82. The door beam main body 78 is made of a hollow or solid shaft. The front connection plate 80 is connected to one end portion of the door beam main body 78, and is joined to a vehicle front-side position on the front door 14 (the inner frame 20). The rear connection plate 82 is connected to the other end portion of the door beam main body 78, and is joined to a vehicle rear-side position on the front door 14 (the stiffener 22).

As illustrated in FIG. 4, the rear connection plate 82, the stiffener 22 and the flange part 44 of the first load transmission member 38 are stacked and integrally joined together.

As illustrated in FIG. 4, outside the second load transmission member 40 in the vehicle-width direction, the inner frame 20 and the stiffener 22 of the front door 14 form the closed cross section 24. In other words, the closed cross section 24 is provided in a position where the closed cross section 24 overlaps the second load transmission member 40. The first load transmission member 38 is contained in the closed cross section 24 (see FIG. 4).

The vehicle 10 to which the vehicle body structure according to the embodiment is applied basically has the above configuration. Next, descriptions will be provided for how the vehicle body structure works, and what effects the vehicle body structure brings about.

In the embodiment, while the seat member 26 is in the dive-down stored condition, the first and second load transmission members 38, 40 are arranged higher than the upper surface of the seat member 26. In the embodiment, in the case where the seat member 26 is in the dive-down stored condition in which no side collision load from the lateral portion of the vehicle need be transmitted to the seat member 26, the above arrangement prevents the transmission of the side collision load, and thus protects the seat member 26. In contrast to this, while the seat member 26 is in the seated condition in which the occupant can be seated in the seat, the side collision load is transmitted from the first load transmission member 38 to the second load transmission member 40, and is transmitted further to the seat member 26 (the seat frame 34) smoothly. This makes the seat member 26 preferably absorb the side collision load.

In the embodiment, even in a case where no side collision load can be transmitted to the seat member 26, things such as the deformation of the outer frame 18 of the front door 14 provides a larger collision stroke for the side collision. The embodiment, therefore, preferably avoids the entry of the front door 14 into the vehicle compartment in the event of the side collision.

This embodiment makes it easy to produce the front door 14 only by changing the layout (arrangement positions) of the first and second load transmission members 38, 40, without changing the production process.

In the embodiment, the first and second load transmission members 38, 40 and the door catcher mechanism 68 are arranged in their respective positions which coincide with one another in the height direction. In the embodiment, even in the case where the seat member 26 is in the dive-down stored condition in which no side collision load need be transmitted to the seat member 26, the above arrangement makes the door catcher mechanism 68 receive (absorbs) the side collision load.

In the embodiment, the door beam member 76 is disposed on the outer side in the vehicle-width direction relative to the first and second load transmission members 38, 40. In the embodiment, the disposal makes the door beam member 76 receives (absorbs) the side collision load (for example, light load) even in the case where the seat member 26 is in the dive-down stored condition in which no side collision load need be transmitted to the seat member 26.

Moreover, in the embodiment, the inner frame 20 and the stiffener 22 form the closed cross section 24 outside the second load transmission member 40 in the vehicle-width direction. In the embodiment, therefore, the closed cross section 24 enhances the rigidity and strength of the front door 14.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A vehicle body structure comprising:
a seat member comprising a seat back, a seat cushion, and a seat frame supporting the seat cushion, the seat cushion and the seat back being configured to incline forward in a front-rear direction of a vehicle to be stacked and stored on a floor of a vehicle body; and
a door member disposed on a vehicle-width directional outer side relative to the seat member; and
a load transmission member disposed in the door member and configured to transmit a side collision load to the seat frame being in a non-stored condition at a side collision,
wherein the load transmission member is disposed higher than an upper surface of the seat back in a stored condition in which the seat member is stacked on the floor,
wherein the door member comprises an inner frame disposed on a vehicle-width directional inner side; and a stiffener disposed on the vehicle-width directional outer side relative to the inner frame, and
wherein the inner frame and the stiffener form a closed cross section on the vehicle-width directional outer side relative to the load transmission member.

2. The vehicle body structure according to claim 1, further comprising:
a door beam member extending in the front-rear direction of the vehicle and disposed in the door member and on the vehicle-width directional outer side relative to the load transmission member.

3. The vehicle body structure according to claim 1,
wherein the load transmission member is disposed higher than an upper surface of either the seat cushion or the seat frame while the seat member is in a stored condition.

4. The vehicle body structure according to claim 3, further comprising:
a door catcher mechanism disposed behind the load transmission member in the front-rear direction of the vehicle,
wherein the load transmission member and the door catcher mechanism are arranged in respective places which, seen from vehicle front side, coincide with each other at least partially in a vertical direction of the vehicle, and
wherein the door catcher mechanism prevents the door member from being displaced inward in a width direction of the vehicle at the side collision.

5. The vehicle body structure according to claim 4, further comprising: a door beam member extending in the front-rear direction of the vehicle and disposed in the door member and on the vehicle-width directional outer side relative to the load transmission member.

6. The vehicle body structure according to claim 3, further comprising:
a door beam member extending in the front-rear direction of the vehicle and disposed in the door member and on the vehicle-width directional outer side relative to the load transmission member.

7. A vehicle body structure comprising:
a seat member comprising a seat back, a seat cushion, and a seat frame supporting the seat cushion and being storable in a floor of a vehicle body;
a door member disposed on a vehicle-width directional outer side relative to the seat member;
a load transmission member disposed in the door member and configured to transmit a side collision load to the seat frame being in a non-stored condition at a side collision; and
a door catcher mechanism disposed behind the load transmission member in a front-rear direction of a vehicle,
wherein the load transmission member and the door catcher mechanism are arranged in respective places which, as seen from a vehicle front side, at least partially coincide with each other in a vertical direction of the vehicle, and
wherein the door catcher mechanism prevents the door member from being displaced inward in a width direction of the vehicle at the side collision.

8. The vehicle body structure according to claim 7, further comprising:
a door beam member extending in the front-rear direction of the vehicle and disposed in the door member and on the vehicle-width directional outer side relative to the load transmission member.

9. The vehicle body structure according to claim 8,
wherein the door member comprises an inner frame disposed on a vehicle-width directional inner side; and a stiffener disposed on the vehicle-width directional outer side relative to the inner frame, and
wherein the inner frame and the stiffener form a closed cross section on the vehicle-width directional outer side relative to the load transmission member.

10. The vehicle body structure according to claim 7,
wherein the door member comprises an inner frame disposed on a vehicle-width directional inner side; and a stiffener disposed on the vehicle-width directional outer side relative to the inner frame, and
wherein the inner frame and the stiffener form a closed cross section on the vehicle-width directional outer side relative to the load transmission member.

* * * * *